(12) United States Patent
Fukushima

(10) Patent No.: US 8,632,716 B2
(45) Date of Patent: Jan. 21, 2014

(54) METHOD OF MANUFACTURING METALLIC DECORATIVE MEMBER

(75) Inventor: Yoshifumi Fukushima, Shimada (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/064,632

(22) Filed: Apr. 5, 2011

(65) Prior Publication Data
US 2011/0248426 A1   Oct. 13, 2011

(30) Foreign Application Priority Data
Apr. 9, 2010   (JP) ................................. 2010-090525

(51) Int. Cl.
*B29C 45/00*   (2006.01)

(52) U.S. Cl.
USPC .................................. 264/328.8; 264/328.12

(58) Field of Classification Search
USPC ................. 264/328.1, 328.12, 328.8
See application file for complete search history.

(56) References Cited

U.S. PATENT DOCUMENTS

| | | | |
|---|---|---|---|
| 2,199,144 A * | 4/1940 | Tegarty ..................... | 264/328.12 |
| 4,399,093 A * | 8/1983 | Kirby et al. .............. | 264/328.12 |
| 4,420,452 A * | 12/1983 | van Dalen et al. ......... | 264/328.8 |
| 4,461,865 A * | 7/1984 | Maeda et al. ................. | 524/440 |
| 5,225,136 A * | 7/1993 | Furugohri et al. ......... | 264/328.8 |
| 5,314,326 A * | 5/1994 | Furugohri et al. ....... | 264/328.12 |
| 6,120,714 A * | 9/2000 | Allan et al. .............. | 264/328.12 |
| 6,558,605 B1 * | 5/2003 | Wilson ........................ | 264/328.8 |
| 2001/0028949 A1 * | 10/2001 | Togawa et al. ............. | 264/328.8 |

FOREIGN PATENT DOCUMENTS

| | | | |
|---|---|---|---|
| JP | 02-202414 | * | 8/1990 |
| JP | 2002-292703 A | | 10/2002 |
| JP | 2010-38561 | * | 2/2010 |

* cited by examiner

*Primary Examiner* — Jill Heitbrink
(74) *Attorney, Agent, or Firm* — Edwards Wildman Palmer LLP

(57) ABSTRACT

There is provided a method for manufacturing a metallic decorative member without a weld line at low cost including: starting injections of molten molding material into a cavity formed by a set of dies from a plurality of gates provided at the cavity; and stopping respectively the injections of the molten molding material from the plurality of gates at different times so as to make dynamic pressure of the molten molding material injected from one gate smaller than dynamic pressure of the molten molding material injected from the other gate at a position on which heads of flows of the molten molding material injected from the one and the other gates contact each other.

4 Claims, 8 Drawing Sheets

METHOD OF MANUFACTURING METALLIC DECORATIVE MEMBER

CROSS REFERENCE TO RELATED APPLICATION

The priority application Japanese Patent Application No. 2010-090525 upon which this patent application is based is hereby incorporated by reference.

BACKGROUND OF THE INVENTION

1. Field of the Invention

The present invention relates to a method of manufacturing a metallic decorative member by injecting molten molding material into a cavity formed by a set of molding dies from a plurality of gates provided at the cavity.

2. Description of the Related Art

FIG. 7 shows a conventional speedometer 1 mounted to an automobile and such, in which the speedometer 1 is provided with an annular decorative member 3 arranged at a boundary of a facing plate 2 and a speedometer dial plate 4. In order to eliminate a process step of coating for obtaining a luxury texture to reduce the cost, the decorative member 3 described above is produced by injection molding using a mixture of metal particles and synthetic resin as molten molding material.

For an injection-molded article such as the metallic decorative member described above, there is a problem of producing a linear scar called a weld line on a surface of the injection-molded article. The mechanism of production of the weld line is described below in reference with FIG. 8A and FIG. 8B.

As shown in FIG. 8, molten molding material 20 which is a melted form of molding material, which is a mixture of synthetic resin 21 and metal particles 22, is injected into a cavity 13 formed by a set of molding dies 11, 12 from a plurality of gates (not shown) of the cavity 13. As the molten molding material 20 flows in the cavity 13, the metal particles 22 included in the molten molding material 20 align at a surface of the molten molding material 20 contacting the molding dies 11, 12 along a direction parallel to the flow of the molten molding material 20. Then, as the injections of the molten molding material 20 from the plurality of gates continues, heads S1, S2 of the molten molding material 20 injected from the different gates move towards each other and contact (merge) each other, as shown in FIG. 8B. At this point, since the injections of the molten molding material 20 from the plurality of gates are performed in a similar manner for each gate, dynamic pressure of the head S1 and dynamic pressure of the head S2 are equal with respect to each other, thus the flows of the molten molding material 20 stop after the respective heads S1, S2 have contact each other. Thus, the heads S1, S2 are stopped before the completion of the alignment of the metal particles 22, so the metal particles 22 remain unaligned. Such unaligned orientation of the metal particles 22 causes production of the weld line on a surface of the injection-molded article.

Japanese Patent Application Publication No. 2002-292703 discloses a method using the injection molding for preventing the production of the above-described weld line. In this method, firstly a die cavity is filled with molten molding material including metal particles, and then the molten molding material is forced to move within the die cavity. According to this method, by forcing the filled molten molding material to move within the cavity, the metal particles at a contacting portion of heads of flows of the molten molding material can be aligned at a surface of the molten molding material along a direction of movement of the molten molding material. As a result, the production of the weld line can be prevented.

SUMMARY OF THE INVENTION

Problems to be Solved

However, the conventional injection molding method described above requires covering the surface of the die cavity with a heat-insulating element to keep the molten molding material in a melted state so the molten molding material can move within the cavity after the cavity is filled with the molten molding material. The conventional injection molding method further requires a mechanism for pushing the molten molding material back and forth in the cavity to force the molten molding material to move within the cavity. As a result, the molding dies as well as an injection molding device become complex, increasing the manufacturing cost of the injection-molded article.

An object of the present invention is to solve the above-described problems by providing a method of manufacturing the metallic decorative member without the weld line at low cost.

Solution to Problems

In order to achieve the above-mentioned object, the present invention provides a method for manufacturing a metallic decorative member by using injection molding in which molten molding material including metal particles is injected into a cavity formed by a set of molding dies from a plurality of gates provided at the cavity, the method including: starting injections of the molten molding material into the cavity from the plurality of gates; and stopping respectively the injections of the molten molding material from the plurality of gates at different times so as to make dynamic pressure of the molten molding material injected from one gate smaller than dynamic pressure of the molten molding material injected from the other gate at a position on which heads of flows of the molten molding material injected from the one and the other gates contact each other.

Advantageous Effect of the Invention

According to the present invention described above, the injections of the molten material from the plurality of gates are stopped respectively at different times for each gate so as to make dynamic pressure of the head of the flow of the molten molding material injected from the one gate smaller than dynamic pressure of the head of the flow of the molten molding material injected from the other gate at a position on which the heads of the flows of the molten material injected from the one and the other gates contact each other. Consequently, after the heads of the flows of the molten molding material from the one and the other gates have contacted each other (merged together), the molten molding material moves in a direction from greater dynamic pressure towards the smaller dynamic pressure. As a result, the metal particles at a contacting portion of the heads of the flows of the molten molding material can be aligned at a surface of the molten molding material along a direction of movement of the molten molding material. Therefore, there is no need to provide a mechanism for moving the molten molding material filled in the cavity. Consequently, the injection-molded article without the weld line can be manufactured at low cost.

BRIEF DESCRIPTION OF THE DRAWINGS

FIGS. 4A through 4D are illustrations explaining an example of how a cavity formed by the set of molding dies is filled with molten molding material injected from a plurality of gates, in which FIG. 4A shows a state before the start of the injections of the molten molding material in which all of the gates are closed, FIG. 4B shows a state in which after opening all of the gates to start the injections of the molten molding material, one of the gates is closed, FIG. 4C shows a state in which another one of the gates is closed subsequently, and FIG. 4D shows a state after the cavity being completely filled with the molten molding material, in which all of the gates are closed;

FIGS. 5A through 5C are illustrations explaining how a head of a flow of the molten molding material contact with a head of another molten molding material that is at a stop, in which FIG. 5A shows a state before the heads of the flows of the molten molding material contact each other, FIG. 5B shows a state just after the heads have contacted each other, and FIG. 5C shows a state in which the metal particles are aligned after the contact of the heads;

FIGS. 6A through 6D are illustrations explaining another example of how a cavity formed by a set of molding dies is filled with the molten molding material injected from plurality of gates, in which FIG. 6A shows a state before the start of the injections of the molten molding material in which all of the gates are closed, FIG. 6B shows a state in which after opening all of the gates to start the injections of the molten molding material, one of the gates is closed, FIG. 6C shows a state in which heads of flows of the molten molding material injected from the respective gates are contacted each other, and FIG. 6D shows a state in which after the cavity being completely filled with the molten molding material, all of the gates are closed;

FIGS. 8A and 8B are illustrations explaining how flows of molten molding material move toward each other and contact each other in a conventional method of manufacturing the metallic decorative member, in which FIG. 8A shows a state before the flows contact each other, and FIG. 8B shows a state after the flows have contacted each other.

DETAILED DESCRIPTION OF THE INVENTION

Figure 7:
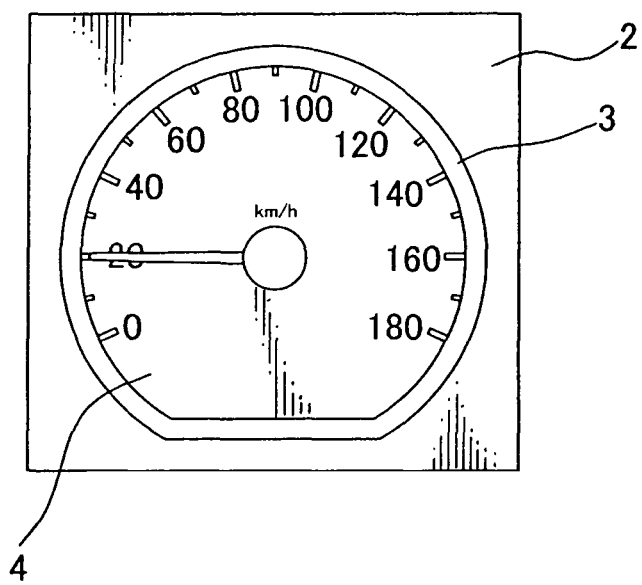
FIG. 7 is a front view of one example of a conventional speedometer provided with a metallic decorative member.
Figure 8A:
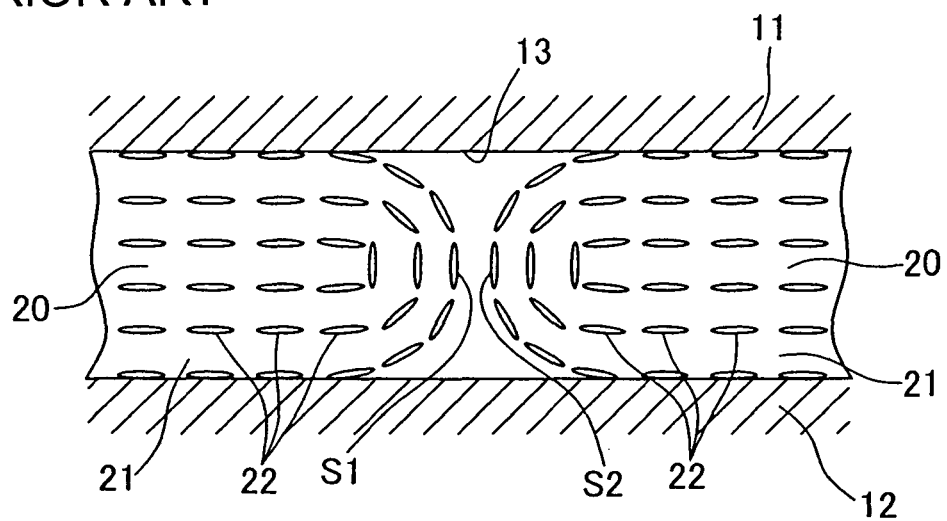
Figure 8B:
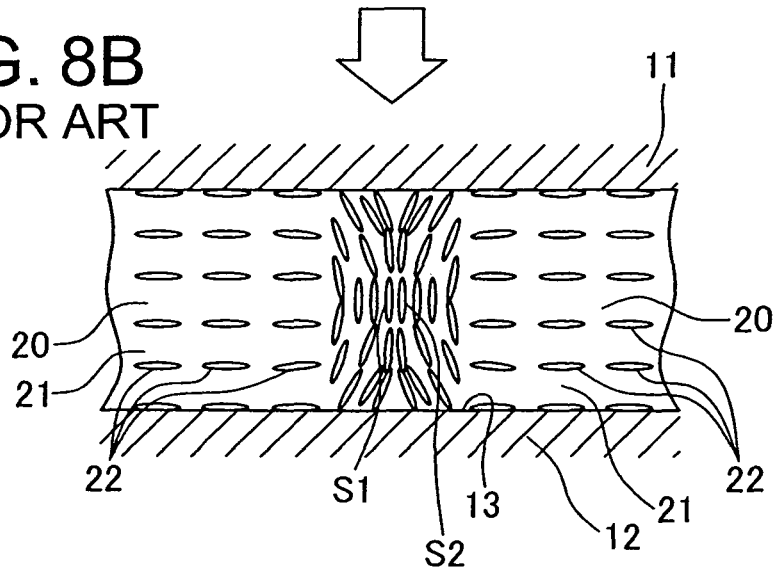

The following describes one exemplary embodiment of an injection molding device using a method of manufacturing a metallic decorative member according to the present invention in reference with the drawings. The components similar to the ones of the conventional art (FIG. 7, FIG. 8A and FIG. 8B) are indicated by the same reference numbers.

Figure 1:
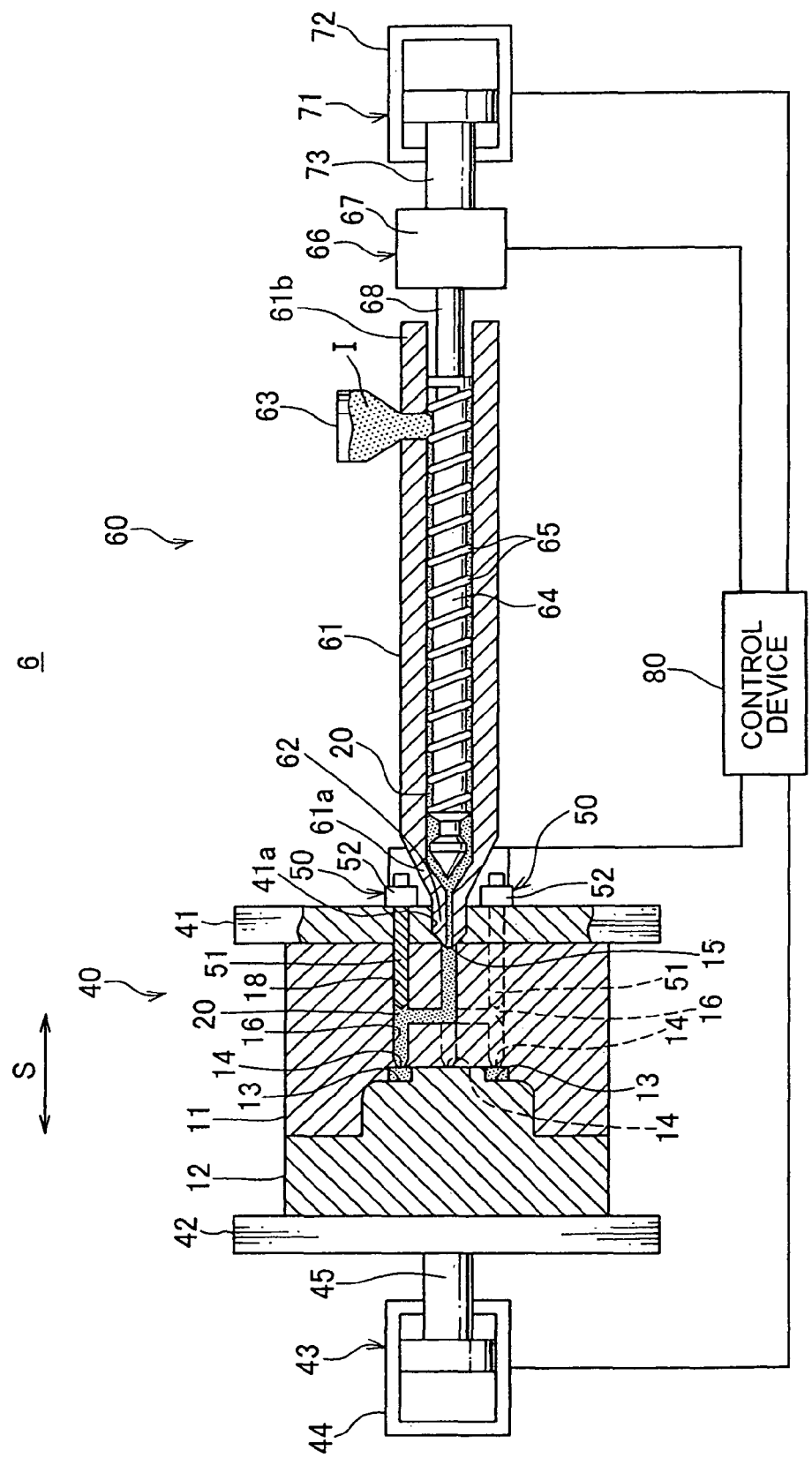
FIG. 1 shows a schematic structure of one embodiment of an injection molding device using a method for manufacturing a metallic decorative member according to the present invention.

An injection molding device 6 performs an injection molding using molten molding material 20 which is a melted form of a molding material I which is a mixture of metal particles and synthetic resin. As shown in FIG. 1, the injection molding device 6 includes a set of molding dies 11, 12, a die holder 40, an injection molding device main body 60, a control device 80 and a plate-like base (not shown) mounted to a work station.

Figure 2:
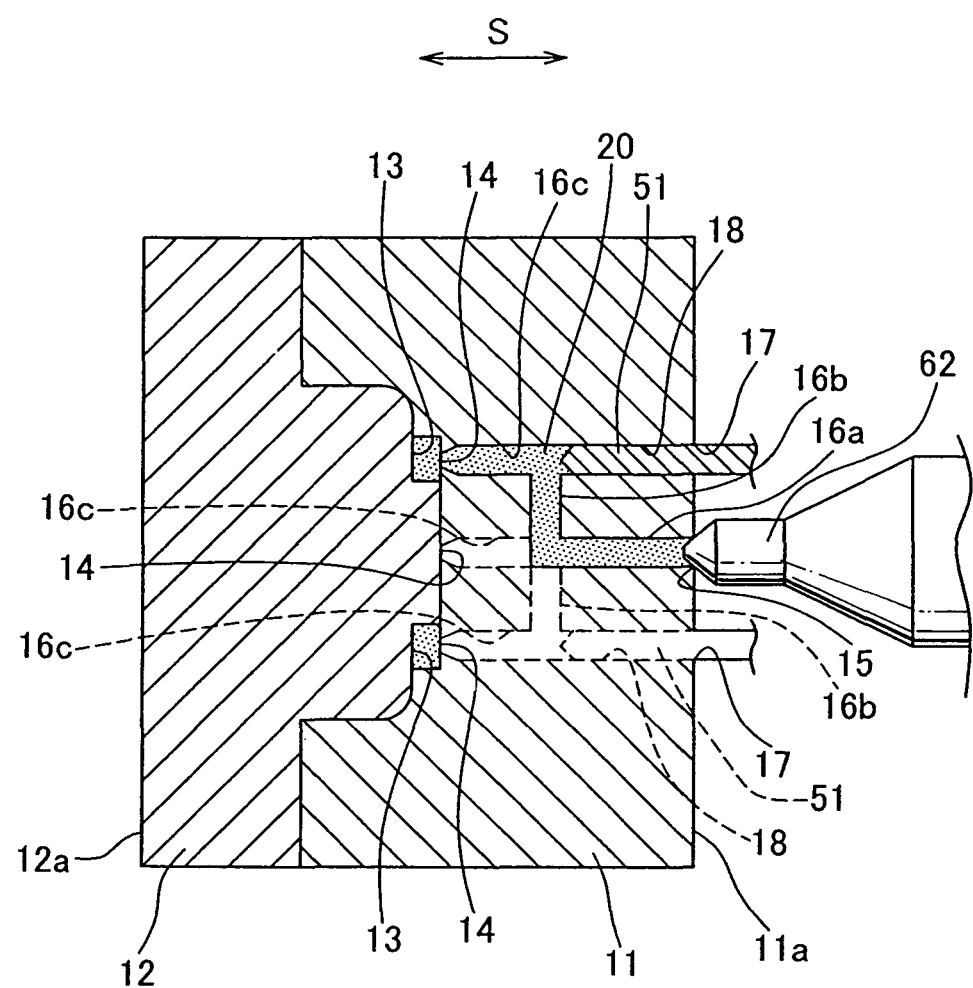
FIG. 2 is a cross-sectional view of a set of molding dies of the injection molding device shown in FIG. 1.
Figure 3:
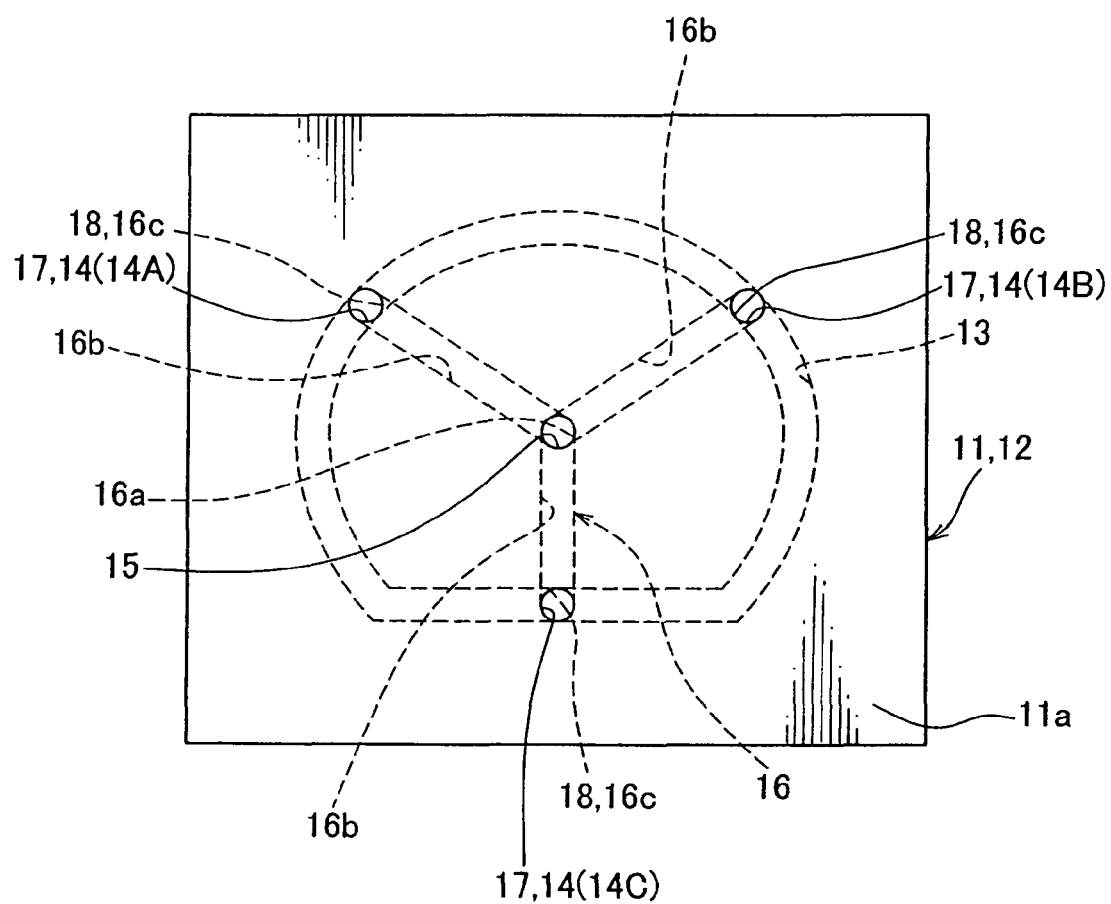
FIG. 3 shows the set of molding dies of the injection molding device shown in FIG. 1 viewed from an engagement direction of the set of molding dies.

FIG. 2 and FIG. 3 show the set of molding dies 11, 12. The respective molding dies 11, 12 are arranged so as to engage with each other as well as to separate from each other. A cavity 13 is formed by the set of molding dies 11, 12, so the cavity 13 corresponds to a space formed by the molding dies 11, 12 engaged to each other. The cavity 13 is formed into a shape corresponding to a shape of an annular decorative member 3 (similar to a decorative member 3 shown in FIG. 7). The cavity 13 is provided with a plurality of gates 14 arranged along the cavity 13 for injecting the molten molding material 20 therefrom into the cavity 13. That is, the plurality of gates 14 is provided at one face of the one molding die 11 so as to open into the cavity 13.

Referring now to FIG. 3, according to one embodiment, a front view of the cavity 13 is formed into an annular shape, in which one portion of a circumference of the annular shape extends linearly along a chord of the circumference so that the annular shape is formed into a D-shape. There are provided three gates 14 (14A, 14B, 14C) at the cavity 13 among which two gates 14A and 14B are provided on an arc portion of the circumference of the annular shape, and one gate 14C is provided at the chord portion of the circumference of the annular shape. The respective gates 14A, 14B, 14C are arranged such that the distance between the gate 14A and the gate 14C along the cavity 13 is equal to the distance between the gate 14B and the gate 14C along the cavity 13, while the distance between the gate 14A and the gate 14B is shorter than the distance between the gate 14A (14B) and the gate 14C. Such arrangement of the cavity 13 is only an example, and as long as the cavity is provided with the plurality of gates, the number of the gates and the shape of the cavity may vary without departing from the object of the present invention. It is advantageous, in view of preventing the production of the weld line, that the width (diameter) of the cavity which is the dimension perpendicular to the flow of the molten molding material is relatively small at the contacting portion of the flows of the molten molding material.

The one molding die 11 is further provided with an inlet 15 arranged at the other face 11a of the one molding die 11, the other face 11a being opposite of the one face with the plurality of gates 14A, 14B, 14C (i.e. the one face being adjacent to the other molding die 12). As shown in FIG. 3, when viewed from an engagement direction of the set of molding dies (i.e. the S direction), the inlet 15 is located at a center with respect to the plurality of gates 14A, 14B, 14C (i.e. the inlet 15 is arranged to be equally distant from the respective gates 14A, 14B, 14C).

Furthermore, the one molding die 11 is provided with a hot runner 16 communicating between the inlet 15 and the respective gates 14A, 14B, 14C. The hot runner 16 includes a first portion 16a extending from the inlet 15 towards the inside of the one molding die 11 along the S direction, a plurality of (three, in this embodiment) second portions 16b extending radially outwardly (in a direction perpendicular to the S direction) and divergingly from an end of the first portion 16a distant from the inlet 15, a plurality of (three, in this embodiment) third portions 16c each extending in the S direction from an end of the respective second portions 16b distant from the first portion 16a to the respective gates 14A, 14B, 14C. The respective third portions 16c are arranged to have the same length.

Furthermore, the other face 11a of the one molding die 11 is provided with a plurality of holes 17 for an opening-closing pin 51 described below. The holes 17 are located correspondingly opposite of the plurality of gates 14A, 14B, 14C, respectively. There are also provided a plurality of through-holes 18 extending from the respective holes 17 to an end of the respective third portion 16c distant from the gates 14A, 14B, 14C. The through-hole 18 communicating between the hole 17 and the third portion 16c has the same cross-section with the third portion 16c and are arranged concentrically with the third portion 16c.

The die holder 40 is a structure for moving the molding die such that the set of molding dies 11, 12 can be engaged with each other and separated from each other. As shown in FIG. 1, the die holder 40 includes a fixed platen 41, a movable platen 42 and a die-clamping cylinder unit 43. The fixed platen 41 and the movable platen 42 are arranged along the S direction in a manner to face each other across the set of molding dies 11, 12. The fixed platen 41 is fixed at the base (not shown) by a fixation member. The one molding die 11 is mounted to the fixed platen 41 such that the other face 11a of the one molding die 11 is disposed on a surface of the fixed platen 41 facing the other molding die 12. The fixed platen 41 is provided with a nozzle through-hole 41a through which a nozzle 62 of the heating cylinder 61 mentioned below. By inserting the nozzle 62 into the nozzle through-hole 41a, the nozzle 62 communicates with the inlet 15 of the one molding die 11. The other molding die 12 is mounted to the movable platen 42 such that a face 12a of the other molding die 12 not facing the one molding die 11 is disposed on a surface of the movable platen 42 facing the fixed platen 41. A die-clamping piston 45 of the die-clamping cylinder unit 43 is attached to a surface of the movable platen 42 not facing the other molding die 12.

Furthermore, the fixed platen 41 is provided with a plurality of actuators 50 located so as to correspond with the plurality of holes 17 of the one molding die 11. The respective actuators 50 are provided with the opening-closing pin 51 and a drive unit 52.

The opening-closing pin 51 is a stick-like member having the cross-sectional shape substantially the same as the third portion 16c of the hot runner 16. The opening-closing pin 51 is arranged to penetrate through the fixed platen 41 to be inserted into and removed from the third portion 16c of the hot runner 16.

The drive unit 52 is constituted of for example a motor or a gear arranged to insert or remove the opening-closing pin 51 into or from the third portion 16c of the hot runner 16. The drive unit 52 is provided on a surface of the fixed platen 41 not facing the one molding die 11 and arranged at a location corresponding to the position of the respective holes 17.

The actuators 50 are communicatably connected to the control device 80 and are operated individually according to a control signal transmitted from the control device 80. For the actuator 50, the drive unit 52 inserts or removes the opening-closing pin 51 into or from the third portion 16c of the hot runner 16, thereby prohibiting or allowing the injections of the molten molding material 20 into the cavity 13 from the gates 14A, 14B, 14C.

The die-clamping cylinder unit 43 may, for example, be a well-known hydraulic cylinder unit and is provided with a die-clamping cylinder 44, the die-clamping piston 45 arranged to slide into and out of the die-clamping cylinder 44, and a hydraulic pump (not shown). The die-clamping cylinder 44 is fixed to the base (not shown) by a fixation member such that an axis of the die-clamping piston 45 is arranged parallel to the S direction. An end of the die-clamping piston 45 is attached to the movable platen 42. The die-clamping cylinder unit 43 is communicatably connected to the control device 80 and operates according to a control signal transmitted from the control device 80. For the die holder 40, the die-clamping cylinder unit 43 moves the other molding die 12 towards the one molding die 11 by sliding the die-clamping piston 45 into the die-clamping cylinder 44 so the other molding die 12 is engaged with the one molding die 11. Furthermore, the die-clamping cylinder unit 43 moves the other molding die 12 away from the one molding die 11 by sliding the die-clamping piston 45 out of the die-clamping cylinder 44 so the other molding die 12 is separated from the one molding die 11.

The injection molding device main body 60 includes the heating cylinder 61, a hopper 63, a screw 64, a screw motor 66 for driving the screw and an injection cylinder unit 71.

The heating cylinder 61 is formed into a tubular shape and is fixed to the base (not shown) via a fixation member. The heating cylinder 61 is arranged so that a longitudinal direction (an axial direction) thereof is parallel to the S direction (i.e. the engagement direction of the set of molding dies 11, 12). An one end 61a of the heating cylinder 61 is formed into a tapered shape and is provided with the nozzle 62. The nozzle 62 is provided with an aperture at a tip of the nozzle 62, the aperture communicating with an inside of the heating cylinder 61. This nozzle 62 is arranged to be inserted into the nozzle through-hole 41a of the fixed platen 41, so the aperture of the nozzle 62 communicates with the inlet 15 of the one molding die 11.

A plurality of heaters (not shown) is attached to an outer surface of the heating cylinder 61. In addition, the tubular hopper 63 is provided at the heating cylinder 61 at a portion adjacent to the other end 61b of the heating cylinder 61 opposite of the one end 61a. The hopper 63 is arranged to feed the molding material I into the heating cylinder 61. The molding material I to be fed through the hopper 63 is a mixture of synthetic resin 21 and metal particles 22 in form of chips.

The screw 64 is formed into a stick-like shape and is received inside the heating cylinder 61 such that the longitudinal direction (axial direction) of the screw 64 is parallel to the longitudinal direction (axial direction) of the heating cylinder 61. Furthermore, the screw 64 is arranged to move with respect to the heating cylinder 61 along the longitudinal direction of the heating cylinder 61 (i.e. the S direction). A projection 65 is provided on an outer surface of the screw 64 in a spiral manner.

The screw 64 is arranged to rotate about the axis thereof to transfer the molding material I between the projections 65 to the one end 61a of the heating cylinder 61, during which the molding material I is heated by the heating cylinder 61 while kneaded by the screw 64, thereby melting the molding material I to produce the molten molding material 20. The molten molding material 20 fills the heating cylinder 61 and then fills the hot runner 16 via the nozzle 62 and the inlet 15. When the molten molding material 20 is injected into the hot runner 16 from the inlet 15, the screw 64 is pushed in the direction away from the one end 61a due to the opposite reaction by the molten molding material 20, thus the injection cylinder unit 71 is arranged to push back the screw 64 in the direction from the other end 61b toward the one end 61a.

The screw motor 66 includes a motor main body 67 and a rotating shaft 68 rotatably attached to the motor main body 67. The motor main body 67 is arranged to move along the longitudinal direction of the heating cylinder 61 (i.e. the S direction). An end of the rotating shaft 68 is attached to an end of the screw 64 distant from the one end 61a of the heating cylinder 61, so that the rotating shaft 68 is arranged concentrically with the screw 64. The screw motor 66 is communicatably connected to the control device 80 and is arranged to rotate the rotating shaft 68 according to a control signal transmitted from the control device 80.

The injection cylinder unit 71 may, for example, be a well-known hydraulic cylinder unit and is provided with an injection cylinder 72, an injection piston 73 arranged to slide into and out of the injection cylinder 72, and a hydraulic pump (not shown). The injection cylinder 72 is fixed to the base (not shown) by a fixation member such that an axis of the injection piston 73 is parallel to the S direction. An end of the injection piston 73 is attached to the motor main body 67 of the screw motor 66 so the injection piston 73 is arranged concentrically with the rotating shaft 68. The injection cylinder unit 71 is communicatably connected to the control device 80 and is arranged to operate according to a control signal transmitted from the control device 80.

The control device 80 is a computer including a well-known RAM, ROM, CPU and such. The control device 80 contains a program for operating the injection molding device 6. The control device 80 is communicatably connected with the die holder 40 (i.e. the die-clamping cylinder unit 43 and the actuators 50) and the injection molding device main body 60 (i.e. the screw motor 66 and the injection cylinder unit 71), so that the control device 80 controls the entire injection molding device 6 by, for example, transmitting a control signal for controlling the die holder 40 and the injection molding device main body 60 according to the above-mentioned program. In addition, the control device 80 is provided with an input device (not shown) including a keyboard and a mouse for inputting a part number or a production quantity in regards to the annular decorative member 3 as an injection-molded article.

The control device 80 transmits a control signal to the die-clamping cylinder unit 43, thereby sliding the die-clamping piston 45 out of the die-clamping cylinder 44 to move the movable platen 42 toward the fixed platen 41 to engage the molding dies 11, 12 with respect to each other, as well as sliding the die-clamping piston 45 into the die-clamping cylinder 44 to move the movable platen 42 away from the fixed platen 41 to separate the molding dies 11, 12 from each other.

Furthermore, the control device 80 transmits a control signal to the screw motor 66 to rotate the screw 64 about the axis, thereby kneading and melting the molding material I fed into the heating cylinder 61 from the hopper 63 and transferring the molding material I to the one end 61a to fill the heating cylinder 61 and the hot runner 16 with the molten molding material 20.

Furthermore, the control device 80 transmits a control signal to the injection cylinder unit 71 thereby projecting the injection piston 73 from the injection cylinder 72 to push the screw motor 66 and the screw 64 in the direction from the other end 61b toward the one end 61a. In such a manner, the molten molding material 20 filled in the heating cylinder 61 is injected (pushed) into the inlet 15 of the one molding die 11 from the nozzle 62.

Furthermore, the control device 80 transmits a control signal to the plurality of actuators 50 to insert and remove the opening-closing pins 51 into and from the third portions 16c of the hot runner 16. Specifically, prior to feeding the molding material I into the heating cylinder 61, the control device 80 transmits a signal to the respective actuators 50 to insert the opening-closing pin 51 into the third portion 16c of the hot runner 16 to close the hot runner 16. Then, by feeding the molding material I into the heating cylinder 61 and rotating the screw 64, the heating cylinder 61 as well as the first portion 16a and the second portion 16b of the hot runner 16 are filled with the molten molding material 20. Subsequently, the control device 80 directs the injection cylinder unit 71 to inject (push) the molten molding material 20 into the inlet 15 from the nozzle 62, and at the same time the control device 80 directs the actuators 50 to remove all of the opening-closing pins 51 out of the respective third portions 16c of the hot runner 16 to open the hot runner 16. Consequently, the molten molding material 20 is injected into the cavity 13 from the respective gates 14A, 14B, 14C through the hot runner 16 at an equal pressure for all of the gates 14A, 14B, 14C. Then, before respective heads of the flows of the molten molding material 20 injected from the plurality of gates 14A, 14B, 14C contact each other, the injections of the molten molding material 20 from the plurality of gates 14A, 14B, 14C are sequentially stopped at different times by inserting the respective opening-closing pins 51 into the third portions 16c of the hot runner 16 to close the hot runner 16 in a predetermined sequence and at a predetermined time interval. The injections of the molten molding material 20 from the plurality of gates 14A, 14B, 14C are sequentially stopped so that the flow of the molten molding material 20 injected from one gate, e.g. 14A, is stopped first and then the flow of the molten molding material 20 injected from the other gate, e.g. 14B, flows into the molten molding material 20 injected from the one gate 14A at a stop. In other words, the control device 80 serves as a means for stopping the injections of the molten molding material 20 from the plurality of gates 14A, 14B, 14C at different predetermined times with respect to the respective gates 14A, 14B, 14C.

As long as the molding material I as the molten molding material 20 is a mixture of the synthetic resin 21 and the metal particles 22 and is suitable for the use in injection molding, the molding material I may be selected from any arbitral kind of material. For example, the synthetic resin 21 may be PE (polyethylene), PP (polypropylene), PS (polystyrene), or PA (polyamide). Furthermore, the metal particles 22 may include iron, copper, zinc, aluminum and such in the form of powder, hollow particles or flakes, or may be oxide of these metals.

The following describes the operation of the above-described injection molding device 6 according to the present invention in reference with FIG. 4A through FIG. 4D. FIGS. 4A to 4D schematically illustrate how the molten molding material 20 fills the cavity 13 formed by the set of molding dies 11, 12. A circled x indicates the closed gate 14 at which the corresponding hot runner 16 (the third portion 16c) is closed by the opening-closing pin 51 to prohibit the injection of the molten molding material 20. An open circle indicates the opened gate 14 at which the corresponding hot runner 16 (the third portion 16c) is open allowing the injection of the molten molding material 20.

Figure 4A:
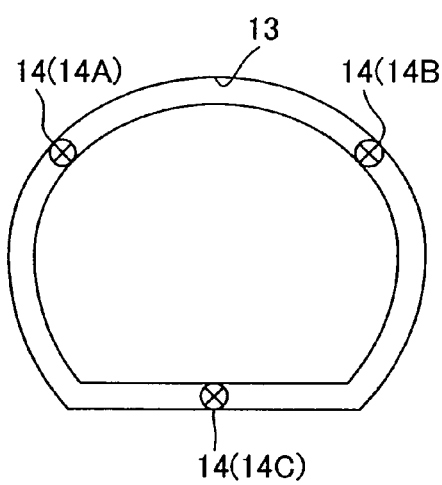

For the above-described injection molding device 6, in step 1, the set of molding dies 11, 12 are engaged together to form the cavity 13. Also, the opening-closing pins 51 are inserted into the third portions 16c of the hot runner 16. At this point, the cavity 13 is empty, and the injection of the molten molding material 20 is prohibited for all of the gates 14A, 14B, 14C, as shown in FIG. 4A.

Next, in step 2, the molding material I in the form of chips is fed into the heating cylinder 61 and melted by a heater and a heat produced from the kneading and the friction by the rotating screw 64. Then, the heating cylinder 61 and the first and the second portions 16a, 16b of the hot runner 16 is filled with the melted molding material I (i.e. the molten molding material 20).

Then, in step 3, the screw 64 and the screw motor 66 are pushed by the injection cylinder unit 71 from the other end 61b toward the one end 61a, thereby pushing the molten molding material 20 from the heating cylinder 61 out of the aperture at the tip of the nozzle 62. At the same time, all of the opening-closing pins 51 are removed from the third portions 16c of the hot runner 16 to open the hot runner 16, thereby injecting the molten molding material 20 into the cavity 13 from all of the gates 14A, 14B, 14C.

Figure 4B:
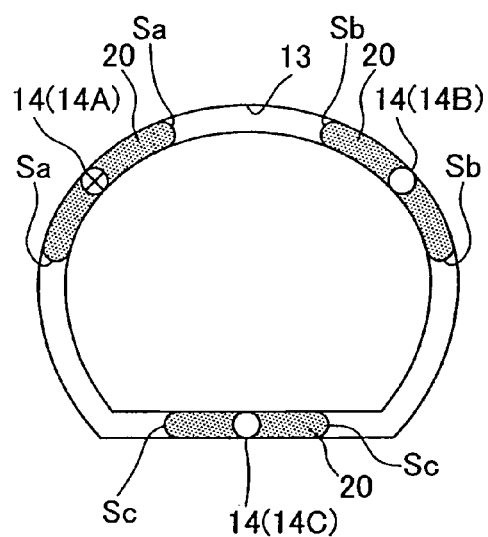

Then, in step 4, as shown in FIG. 4B, the opening-closing pin 51 corresponding to the first gate 14A is inserted into the third portion 16c of the hot runner 16 at a predetermined time T1 which is a time before the heads Sa, Sb and Sc of the flows of the molten molding material 20 injected from the respective gates 14A, 14B, 14C contact each other. Consequently, the injection of the molten molding material 20 from the first gate 14A is stopped and the head Sa is stopped.

Figure 4C:
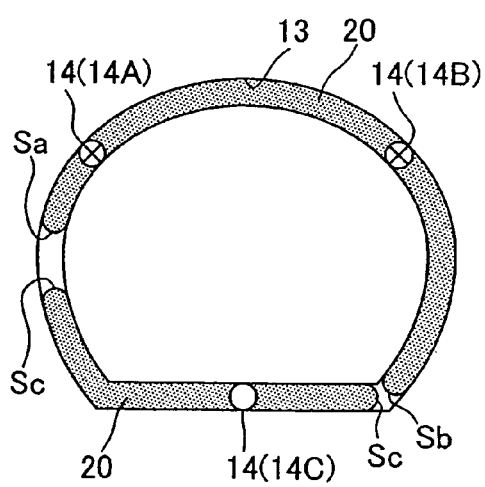

In step 5, as shown in FIG. 4C, the opening-closing pin 51 corresponding to the second gate 14B is then inserted into the third portion 16c of the hot runner 16 at a predetermined time. T2 which is a time after the head Sa and the head Sb have contacted each other and before the head Sc and the head Sa as well as the head Sc and the head Sb contact each other. Consequently, the injection of the molten molding material 20 from the second gate 14B is stopped and the head Sb is stopped.

Figure 4D:
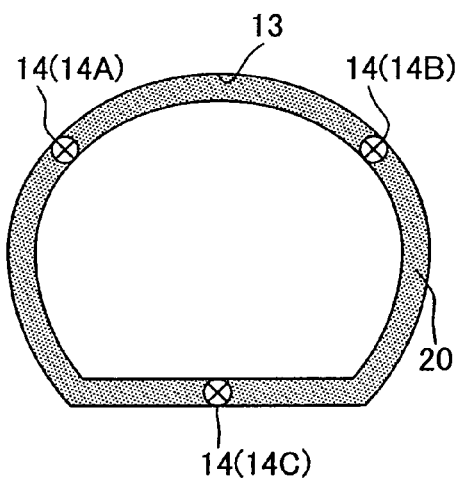

Then, in step 6, as shown in FIG. 4D, the opening-closing pin 51 corresponding to the third gate 14C is inserted into the third portion 16c of the hot runner 16 at a time T3 which is a time after the heads Sa, Sb and Sc have contacted each other and the cavity 13 is completely filled with the molten molding material 20. Consequently, the injection of the molten molding material 20 from the third gate 14C is stopped.

Subsequently, after the molten molding material 20 filled within the cavity 13 is solidified, the molding dies 11, 12 are separated from each other to take out the injection-molded article, i.e. the decorative member 3.

Figure 5A:
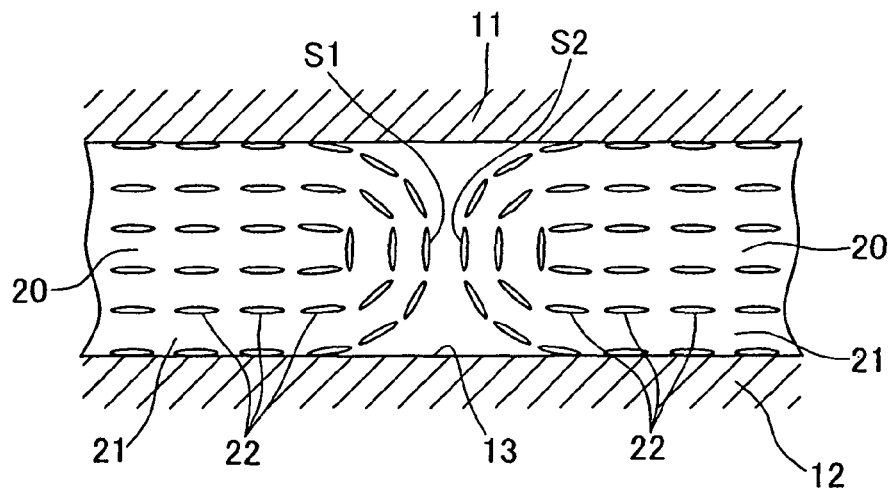
Figure 5B:
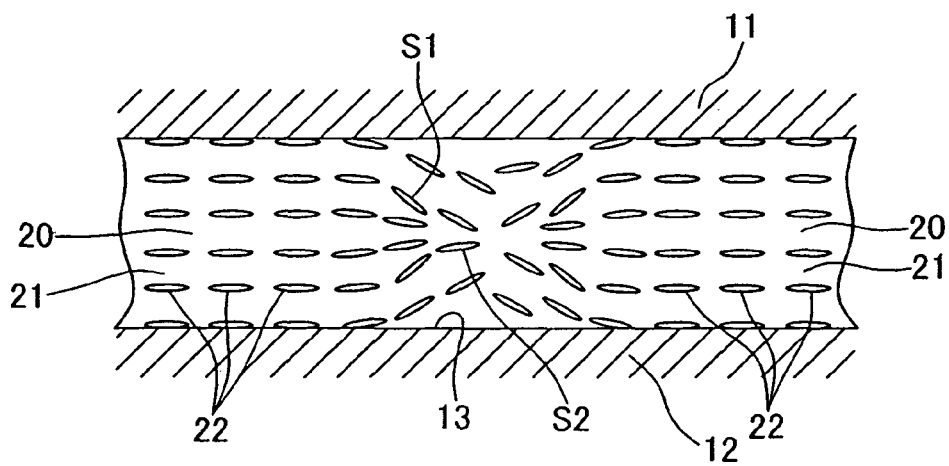
Figure 5C:
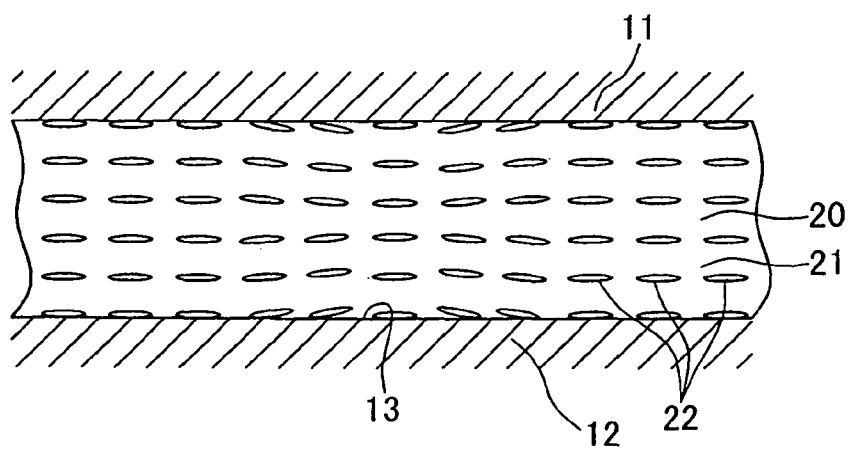

As described above, by controlling the injections of the molten molding material 20 from the plurality of gates 14A, 14B, 14C to stop at the different times T1, T2 and T3, the heads of the flows of the molten molding material 20 from the plurality of gates 14A, 14B, 14C contact each other such that, for example, the head of the flow of the molten molding material 20 injected from the first gate 14A is stopped first, and then the head of the flow of the molten molding material 20 injected from the second gate 14B flows into the head of the molten molding material 20 injected from the first gate 14A at a stop when the molten molding material 20 injected from the first and the second gates 14A, 14B contact each other. In this case, the head of the molten molding material 20 injected from the first gate 14A at a stop has dynamic pressure of substantially zero, and the head of the molten molding material 20 injected from the second gate 14B which is still moving has dynamic pressure of greater than zero. Thus, dynamic pressure of the head of the molten molding material 20 injected from the first gate 14A is smaller than dynamic pressure of the head of the molten molding material 20 injected from the second gate 14B when the heads of these molten molding material 20 from the first and the second gates 14 contact each other. FIG. 5A through FIG. 5C show how the heads of the flows of the molten molding material 20 contact each other under the condition described above.

FIG. 5A shows the one head S1 of the molten molding material 20 which is at a stop and the other head S2 of the molten molding material 20 which is moving towards the one head S1. As shown in FIG. 5B, after the one head S1 and the other head S2 have contacted each other, the other head S2 flows into the one head S1 at a stop, thereby producing movement in the stopped head S1, since dynamic pressure of the one head S1 at a stop is smaller than dynamic pressure of the other head S2 which is still moving. As a result, these heads S1, S2 of the molten molding material 20 keep moving just after these heads S1, S2 have contacted each other. Consequently, the metal particles 22 align at the surface of the molten molding material 20 in the direction of the movement of the molten molding material 20. In addition, as will be understood by the skilled person, the steps 3 through 6 described above correspond to a filling process.

Therefore, according to the present invention, before the heads of the molten molding material 20 injected from the plurality of gates 14 are to contact each other, the injections of the molten molding material 20 from the plurality of gates 14 are stopped at the different times so as to make dynamic pressure of the molten molding material 20 injected from one gate 14 is smaller than dynamic pressure of the molten molding material 20 injected from the other gate 14 when the heads of the molten molding material 20 injected from the one and the other gates 14 contact each other. Consequently, after the heads of the molten molding material 20 have contacted (merged) each other, the molten molding material 20 moves in a direction from greater dynamic pressure to smaller dynamic pressure. As a result, the metal particles 22 at the contacting portion of the molten molding material 20, where the above-mentioned two heads of the flows of the molten molding material 20 contacted each other, align at the surface of the molten molding material 20 along the direction of the movement of the molten molding material 20. Consequently, the injection molding device 6 does not require a mechanism and a control device for moving the molten molding material 20 after the completion of the filling process, thereby manufacturing the injection-molded article with no weld line at low cost.

In the embodiment described above, the injections of the molten molding material 20 from the plurality of gates 14A, 14B, 14C are stopped sequentially at different times T1, T2 and T3, respectively. However, the present invention is not limited to this, and, for example, the injections from the two gates 14B and 14C may be stopped at the same time at T1 described above, followed by stopping the injection from the other gate 14A at T3 described above. The present invention may be modified without departing from the object of the present invention, as long as the injections of the molten molding material 20 from the plurality of gates 14 is stopped at different times so as to make dynamic pressure of the molten molding material 20 injected from the one gate 14 is smaller than dynamic pressure of the molten molding material 20 injected from the other gate 14 when these molten molding material 20 from the one and the other gates 14 contact each other. For example, the position of the gates, the sequence for stopping the injection and the number of gates to be stopped at the same time may be arranged arbitrarily.

Furthermore, in the embodiment described above, the injection-molded article (the decorative member 3) is formed into the annular shape; however, the shape of the injection-molded article may vary. For example, according to another embodiment of the present invention, an injection-molded article may be formed into a stick-like shape as shown in FIG. 6A through FIG. 6D.

Figure 6A:
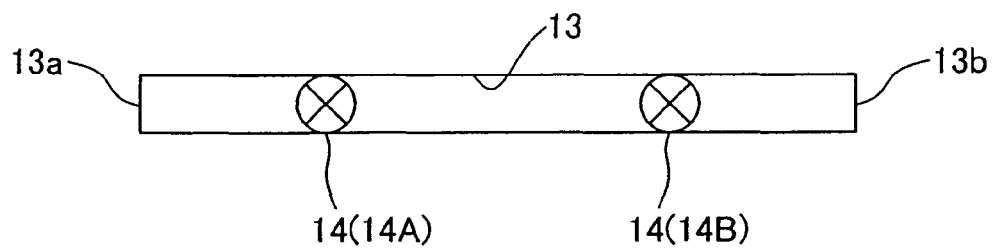
Figure 6B:
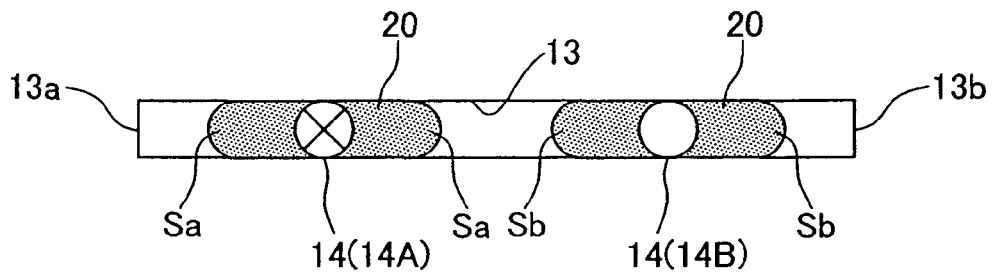
Figure 6C:
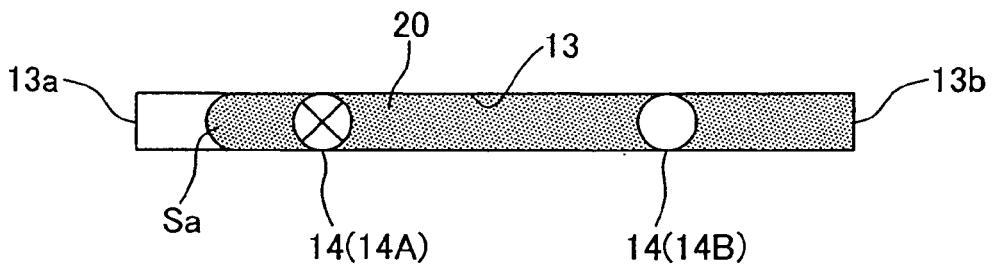
Figure 6D:
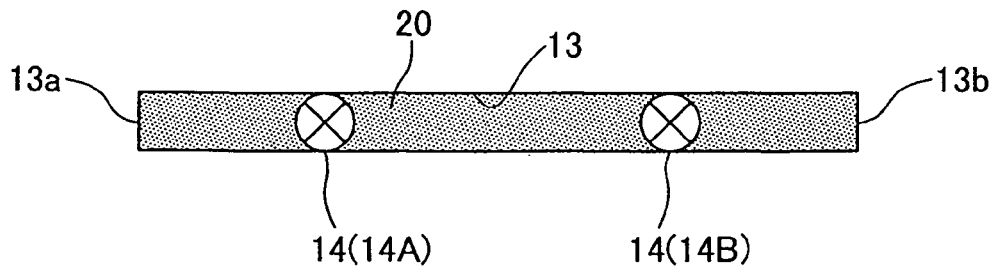

Referring now to FIG. 6A thorough FIG. 6D (the components similar to those of the above-described embodiment are indicated with the same reference numbers), there is provided a cavity 13 having a stick-like shape formed by a set of molding dies (not shown). Two gates 14A and 14B are arranged at the cavity 13. These two gates 14A and 14B are arranged distant from both longitudinal ends 13a and 13b of the cavity 13 with a space between each other.

FIG. 6A shows a state before the start of the injections of the molten molding material 20. In this state, the cavity 13 is empty, and all of the gates 14A, 14B are closed prohibiting the injections of the molten molding material 20. Then, the injection cylinder unit 71 starts injecting the molten molding material 20 into the inlet 15, and at the same time the opening-closing pins 51 are removed from the hot runners 16 to inject the molten molding material 20 into the cavity 13 from the two gates 14A, 14B.

Then, as shown in FIG. 6B, the opening-closing pin 51 corresponding to the one gate 14A is inserted into the hot runner 16 at a time U1 which is a time before heads Sa, Sb of the flows of the molten molding material 20 injected from the respective gates 14A, 14B contact each other and before the heads Sa, Sb reach to the ends 13a, 13b of the cavity 13. Consequently, the injection of the molten molding material 20 from the one gate 14A is stopped so the head Sa of that molten molding material 20 is stopped.

Then, as the injection of the molten molding material 20 from the other gate 14B continues, the head Sa and the head Sb contact each other as shown in FIG. 6C. Subsequently, as shown in FIG. 6D, the opening-closing pin 51 corresponding to the other gate 14B is inserted into the hot runner 16 at a time U2 at which the cavity 13 is filled with the molten molding material 20, thereby stopping the injection of the molten molding material 20 from the other gate 14B.

As described above, by controlling the injections of the molten molding material 20 from the plurality of gates 14A, 14B to stop at different times U1 and U2, before the heads of the flows of the molten molding material 20 injected from the one and the other gates 14A, 14B contact each other, the head of the molten molding material 20 injected from the one gate 14A is stopped firstly, and the head of the molten molding material 20 injected from the other gate 14B flows into the head of the molten molding material 20 at a stop. As a result, as described above, the metal particles 22 at the contact portion of the molten molding material 20 where the heads Sa, Sb contacted each other align at the surface of the molten molding material 20 along the direction of the movement of the molten molding material 20. Consequently, the injection molding device 6 does not require a mechanism and a control device for moving the molten molding material 20 after the completion of the filling process, thereby manufacturing the injection-molded article with no weld line at low cost.

In the above-described embodiments, the injection of the molten molding material 20 from the gate 14 is controlled by inserting or removing the opening-closing pin 51 into or from the third portion 16c of the hot runner 16 of the molding die 11. However, in an alternative embodiment, there may be provided a plurality of nozzles 62 of the heating cylinder 61 so as to correspond with the plurality of gates 14, respectively, to control the injection of the molten molding material 20 from the gate 14. In this case, the nozzle 66 may be provided with an opening-closing structure to open and close the aperture at the tip of the nozzle 66. Furthermore, the injection may be controlled by any arbitral mechanism suitable for a structure of the injection molding device without departing from the object of the present invention.

The embodiments described herein are only representative embodiments and are not intended to limit the present invention. It will be understood that various modifications to the embodiments may be made without departing the frame of the present invention.

What is claimed is:

1. A method for manufacturing a metallic decorative member by using injection molding of injecting molten molding material including metal particles into a cavity formed by a set of molding dies from a plurality of gates provided to the cavity, the method comprising:
    starting injections of the molten molding material into the cavity from the plurality of gates; and
    stopping respectively the injections of the molten molding material from the plurality of gates at different times
    so as to make dynamic pressure of the molten molding material injected from one gate smaller than dynamic pressure of the molten molding material injected from the other gate at a position on which heads of flows of the molten molding material injected from the one and the other gates contact each other so that the metal particles at a contacting portion of the heads of the molten molding material are aligned at a surface of the molten molding material along a direction of movement of the molten molding material,
    wherein the one gate is closed before the heads of flows of the molten molding material injected from the one and the other gates contact each other, and
    the gates are arranged to have a distance between one pair of gates being shorter than the distances between the other pairs of gates.

2. A method for manufacturing a metallic decorative member according to claim 1, wherein:
    the cavity is formed into an annular shape, in which one portion of a circumference of the annular shape extends linearly along a chord of the circumference so that the annular shape is formed into a D-shape.

3. A method for manufacturing a metallic decorative member according to claim 2, further comprising:
    providing three gates at the cavity among which two gates are provided on an arc portion of the circumference of the annular shape, and one gate is provided at the chord portion of the circumference of the annular shape.

4. A method for manufacturing a metallic decorative member by using injection molding of injecting molten molding material including metal particles into a cavity formed by a set of molding dies from a plurality of gates provided to the cavity, the method comprising:
    providing the cavity formed into an annular shape, in which one portion of a circumference of the annular shape extends linearly along a chord of a circumference so that the annular shape is formed into a D-shape;
    starting injections of the molten molding material into the cavity from the plurality of gates; and
    stopping respectively the injections of the molten molding material from the plurality of gates at different times,
    so as to make dynamic pressure of the molten molding material injected from one gate smaller than dynamic pressure of the molten molding material injected from the other gate at a position on which heads of flows of the molten molding material injected from the one and the other gates contact each other,
    so that the metal particles at a contacting portion of the heads of the molten molding material are aligned at a surface of the molten molding material along a direction of movement of the molten molding material, wherein the one gate is closed before the heads of flows of the molten molding material injected from the one and the other gates contact each other, and
    the gates are arranged to have a distance between one pair of gates being shorter than the distances between the other pairs of gates.

* * * * *